Patented Mar. 9, 1926.

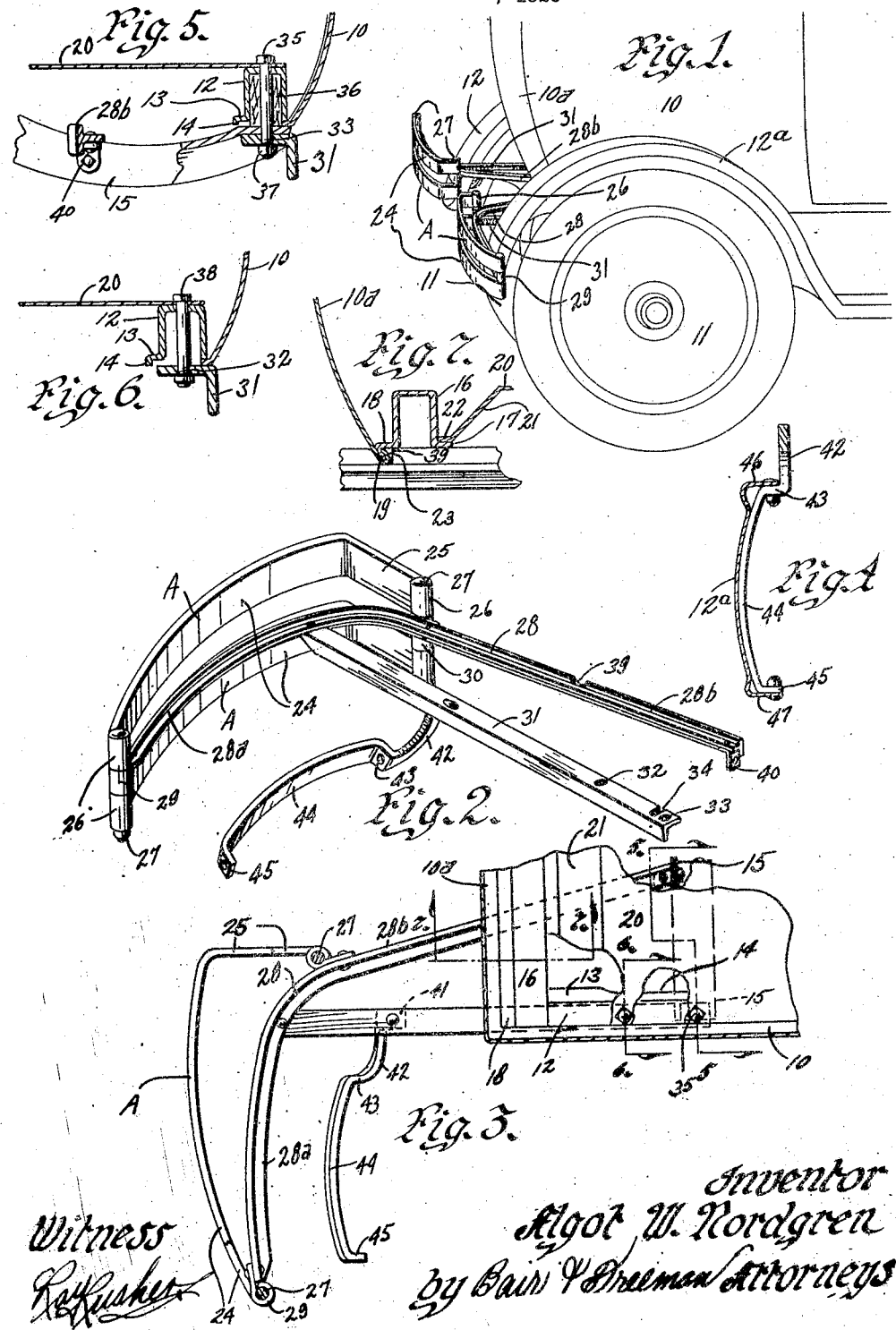

1,576,484

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

FENDER GUARD.

Application filed November 25, 1925. Serial No. 71,345.

*To all whom it may concern:*

Be it known that I, ALGOT W. NORDGREN, a citizen of the United States, and a resident of St. Paul, in the county of Ramsey and State of Minnesota, have invented a certain new and useful Fender Guard, of which the following is a specification.

The object of my invention is to provide a fender guard of simple, durable and inexpensive construction.

More particularly, it is my object to provide a fender guard of the kind which can be manufactured in the factory in pairs adapted for use as rights and lefts, and may be mounted independently on the frame of an automobile, either at the front or rear, and which when mounted at the rear will afford between them a space for the spare tire carrier and spare tire.

Still another object is to provide such a fender guard having a vertical spaced pair of parallel spring members having curved portions adapted to overlap the rear end of a fender, the inner end portions projecting from said curved portions toward the car body, said device having a rigid support connecting the ends of said spring members and extended therefrom to the car body and secured thereto, and to provide in connection with the structure already described a brace member extending from said rigid member at a point between its points of connection with the ends of the spring devices toward the car body.

A further purpose is to provide in such a device as has been above described a fender brace element.

With these and other objects in view, my invention consists in the construction, arrangement and combination of the various parts of my fender guard, whereby the objects contemplated are attained, as hereinafter more fully set forth, pointed out in my claims, and illustrated in the accompanying drawings, in which:

Figure 1 is a perspective view of part of a motor vehicle equipped with a pair of my improved fender guards.

Figure 2 is a perspective view of one of my fender guards.

Figure 3 is a horizontal, sectional view of the car body showing my improved fender guard installed thereon, the fender guards being shown partly in horizontal section and partly broken away.

Figure 4 is a horizontal, sectional view through the rear end of one of the fenders ilustrating a manner of attaching a fender brace element thereto.

Figure 5 is a detail, sectional view taken on the line 5—5 of Figure 3.

Figure 6 is a sectional view taken on the line 6—6 of Figure 3; and

Figure 7 is a sectional view taken on the line 7—7 of Figure 3.

In the drawings herewith by which I have illustrated a form in which my invention may be embodied and a manner in which it may be used, I have employed the reference numeral 10 to indicate generally the body of a motor vehicle, having the rear wheels 11 and the fenders 12ª.

Assuming that my improved fender guard is installed on a Ford car, I have shown such a car having near its rear end the longitudinal, downwardly opening channel-shaped frame member 12, having at its inner side at the lower edge of its inner wall, a lateral extension 13 terminating in a downward extension 14.

Such a car has also the downwardly opening transverse frame member 15, shown in Figure 5, and rearwardly therefrom the transverse frame member 16 in the form of a downwardly-opening channel having at the lower edges of its walls, the lateral projections 17 and 18.

The flange or projection 18 has at its outer, rear edge a downwardly, inclined portion 19 shown in Figure 7.

The bottom 20 of the body 10 rests on the member 12 and at its rear end has a downwardly, inclined portion 21 terminating in a horizontal flange 22 resting on the flange 17.

The back 10ª of the car body 10 has formed at its lower edge a channel 23 receiving the flange or extension 19.

The features of structure above described are the ordinary features of structure of the Ford car and are here described somewhat fully because one of the purposes of my fender guard, although perhaps not the most important one is to make a fender guard peculiarly adapted to be connected with and mounted on the standard Ford structure with the least inconvenience.

My improved fender guard comprises a pair of vertically spaced, resilient strap bumper bars A, each comprising a rear curved portion 24 arranged to stand just rearwardly or just forwardly as the case may be from the end of the fender.

I have illustrated my device as mounted on the rear of a Ford.

Assuming that the parts are in position for installation on the rear end of a Ford and that reference is being made to the right-end fender guard, it will be noted that at the inner end of each curved member 24, such spring bumper bar has a portion 25 extending substantially directly toward the car body.

At the ends of the bumper bars A are formed eyes 26, which receive bolts or pins 27. A supporting member 28 may be made of T iron and has at one end an eye 29 mounted on the outer pin 27 and has secured to it between its ends another eye 30 mounted on the inner pin 27.

It will be understood that the supporting member 28 is secured to the pins 27 between the respective spring bumper bars 24 and serves to hold them vertically spaced.

The supporting member 28 has a curved portion 28$^a$ between the pins 27 and a portion 28$^b$ projecting from the inner pin 27 toward the car body at a slight inclination from a line parallel with the longitudinal axis of the car body.

Secured to the supporting member 28 between the pins 27 and substantially nearer the inner pin 27 is a supporting element 31, which may have the form of a channel bar, which extends from the portion 28$^a$ of the member 28 toward the car body, and when installed stands just below the rear portion of the longitudinal frame member 12.

At its forward end, the supporting element 31 (assuming that the fender guard is installed at the rear of the automobile) is provided in its upper horizontal flange with spaced holes 32 and 33.

Near its extreme end and between the holes 32 and 33, the upper, horizontal flange of the element 31 is provided with a notch 34.

In the installation of the device, the notch 34 receives the end of the rear flange or wall of the transverse member 15 and the front end of the element 31 abuts against the forward flange or wall of the transverse member 15 for strengthening the connection with the car.

In the Ford car, the bottom 20, the longitudinal frame member 12, and the transverse member 15 are connected by a bolt 35, which also extends through a filler 36 in the member 12.

A nut 37 on the bolt 35 is removed and the element 31 is installed with the bolt 35 extended through the hole 33 and thereupon the nut 37 is replaced.

The bottom 20, the frame member 12, and the supporting element 31 are secured together by another bolt 38 extended through the hole 32.

The supporting member 28 has in its upper flange a notch 39 which receives the flange 19 and the channel 23, as shown in Figure 7, so that the supporting member 28 may be held snugly against the under surface of the flange 17.

At the forward end of the supporting member 28 is fastened an angle 40, which is bolted to the rear flange or wall of the transverse frame member 12, as shown in Figure 3.

There is thus afforded an extremely rigid connection and supporting means between the fender guard and the car body.

The member 28 is a continuous member extending from the outer pin 27 to the car body and the element 31 affords a rigid brace, whereby the fender guard is mounted to resist side thrusts and strains by being rigidly connected with the longitudinal frame member of the car at two points as by the bolts 35 and 38 and with the transverse frame member at one point.

I preferably secure to the under side of the upper horizontal flange of the element 31, a flat portion 41 of a fender brace made in the form of a piece of strap iron, which has a portion 42 extending downwardly and laterally from the portion 41, and thence rearwardly as at 43, and thence away from the element 31, and forming the portion 44 curved to fit the under, rear part of the fender, and then has the forwardly projecting portion 45.

The portions 43, and 45 fit the flanges 46 and 47 of the fender and are bolted thereto as shown.

I claim as my invention:

1. A fender guard support, comprising a rigid supporting member having a portion adapted to be secured to a car frame and extending away therefrom and terminating in a curved portion inclined at a substantial angle to said first portion, and a supporting element pivoted to the latter portion of said first member and adapted to be mounted on the longitudinal frame member of the car.

2. In a device of the class described, a supporting member having a portion adapted to be secured to the frame of a car and a curved portion inclined away therefrom, a spring bumper device mounted on said curved portion, a rigid supporting element fixed to said curved portion and adapted to be secured to a car body, the first portion of said first member and said supporting element being inclined at an angle to each other for better bracing effect.

3. In a device of the class described, a supporting member having a portion adapted to be secured to the frame of a car and a curved portion inclined away therefrom, a spring bumper device mounted on said curved portion, a rigid supporting element fixed to said curved portion and adapted to be secured to a car body, the first portion of said first member and said supporting element being inclined at an angle to each other for better bracing effect, and a fender brace for connecting said supporting element with a fender.

4. In a fender guard, a pair of spring bumper members vertically spaced, each comprising portions adapted to be placed substantially parallel with the longitudinal axis of a car and curved portions inclined away from said first portions and adapted to stand spaced from the ends of the car fenders for protecting such ends, a supporting member having a curved portion secured to the respective ends of said spring bumper members, and a portion extending away from said spring bumper members and adapted to be fastened to a car body, a supporting element secured to the curved portion of said supporting member between the ends of the spring bumper members and inclined away therefrom at an angle to the first portion of the first supporting member and adapted to be secured to the body of a car.

5. The combination of a car body having a longitudinal and a transverse frame member with a fender guard comprising a supporting member secured to said transverse frame member and inclined away therefrom at an acute angle to the longitudinal axis of the car and having at its outer end a laterally curved portion, a supporting element secured to said curved portion and extending away therefrom at an acute angle with relation to the first portion of said supporting member and secured to the longitudinal frame member of the car.

6. The combination of a car body having a longitudinal and a transverse frame member with a fender guard comprising a supporting member secured to said transverse frame member and inclined away therefrom at an acute angle to the longitudinal axis of the car and having at its outer end a laterally curved portion, a supporting element secured to said curved portion and extending away therefrom at an acute angle with relation to the first portion of said supporting member and secured to the longitudinal frame member of the car, and a spring bumper member having its ends secured to said curved portion of said first member near the ends thereof, and its body portion spaced from said curved portion.

7. The combination of a car body having a longitudinal and a transverse frame member with a fender guard comprising a supporting member secured to said transverse frame member and inclined away therefrom at an acute angle to the longitudinal axis of the car and having at its outer end a laterally curved portion, a supporting element secured to said curved portion and extending away therefrom at an acute angle with relation to the first portion of said supporting member and secured to the longitudinal frame member of the car, and a pair of vertically spaced, substantially parallel spring bumper members having their ends secured to the curved portion of said first-named supporting member and comprising portions substantially parallel with the longitudinal axis of the car, and portions curved away from said first portions laterally and adapted to stand adjacent to and protect the ends of the car fenders and fenders on said car.

8. The combination with an automobile having a frame, of a fender guard, comprising a supporting member secured to the frame and extending rearwardly therefrom and having at its rear end a curved portion inclined at an angle to said supporting member, a bumper element secured to the end of said curved portion and extending in the rear of a fender of an automobile, a bracing element for the fender guard having its forward end fixed to the same frame member as the supporting member at a point substantially spaced therefrom, said bracing element being connected to the bumper element through the supporting member, whereby the fender guard will be braced relative to the automobile.

9. The combination of a motor vehicle frame and fender structure, with a fender guard structure having a supporting member secured to the vehicle frame and extending rearwardly therefrom and having at its rear part a curved portion, a bracing element fixed at one end to the supporting member and at the other end to the same frame member as that to which the supporting member is fixed at a point substantially spaced from the supporting member, a bumper element fixed at one end to the curved portion of said supporting member, said curved portion having an eyelet, said bumper element comprising spaced curved spring members, having vertically spaced eyelets located respectively above and below said first eyelet, and a bolt extended through said eyelets, eyelets at the other ends of said spring members, a bolt extended through said last eyelet, means for connecting said last bolt with the supporting member, and means for connecting said fender guard structure with the fender structure.

10. The combination of a motor vehicle frame having a transverse frame member with a bumper supporting structure having a supporting member connected with said transverse frame member and extending away therefrom and having a curved end portion, a brace element connected with said bumper supporting member and with the same transverse frame member, and a bumper device supported on said bumper supporting structure, comprising vertically spaced spring members having eyes at their ends, and bolts extended through said eyes and connected with the said bumper supporting structure.

ALGOT W. NORDGREN.